(12) United States Patent
LoRocco

(10) Patent No.: US 8,522,766 B2
(45) Date of Patent: Sep. 3, 2013

(54) DETACHABLE QUIVER ASSEMBLY FOR ARCHERY BOWS

(75) Inventor: Paul LoRocco, Dallas, TX (US)

(73) Assignee: TruGlo, Inc., Richardson, TX (US)

(*) Notice: Subject to any disclaimer, the term of this patent is extended or adjusted under 35 U.S.C. 154(b) by 349 days.

(21) Appl. No.: 12/913,993

(22) Filed: Oct. 28, 2010

(65) Prior Publication Data
US 2012/0103315 A1    May 3, 2012

(51) Int. Cl.
F41B 5/06    (2006.01)
F16B 7/00    (2006.01)
F16B 5/00    (2006.01)

(52) U.S. Cl.
CPC .. *F41B 5/066* (2013.01); *F16B 5/00* (2013.01)
USPC .............. 124/88; 124/25.7; 124/41.1; 124/86

(58) Field of Classification Search
CPC .................................. F41B 5/066; F16B 5/00
USPC .................. 124/25.7, 41.1, 86, 88; 403/376, 403/380, 381
See application file for complete search history.

(56) References Cited

U.S. PATENT DOCUMENTS

| | | | | |
|---|---|---|---|---|
| 3,777,734 A * | 12/1973 | Rose | ............................. | 124/25.5 |
| 4,156,496 A * | 5/1979 | Stinson | ........................ | 124/25.7 |
| 4,195,616 A * | 4/1980 | Darlington | ................... | 124/25.7 |
| 4,247,027 A * | 1/1981 | Tardiff | ........................... | 224/197 |
| 4,252,101 A * | 2/1981 | Spitzke | ........................... | 124/45 |
| 4,363,312 A * | 12/1982 | Spitzke | ........................... | 124/45 |
| 4,621,606 A | 11/1986 | Toth | | |
| 4,704,800 A * | 11/1987 | Stinson | ........................... | 33/265 |
| 4,788,961 A * | 12/1988 | Toth | ............................. | 124/25.5 |
| 4,805,584 A * | 2/1989 | Stinson | ........................... | 124/86 |
| 4,995,372 A * | 2/1991 | Topel | ............................ | 124/25.5 |
| 5,076,522 A * | 12/1991 | Stinson | ...................... | 248/216.1 |
| 5,265,585 A * | 11/1993 | Stinson | ........................... | 124/88 |
| 5,566,665 A * | 10/1996 | Stinson | ........................... | 124/86 |
| 5,690,088 A * | 11/1997 | Ruble | .......................... | 124/25.7 |
| 6,006,734 A * | 12/1999 | Sodaro | ............................ | 124/86 |
| 6,105,566 A * | 8/2000 | Tiedemann | ...................... | 124/86 |
| 6,328,189 B1 * | 12/2001 | Norden | ......................... | 224/197 |
| 6,666,204 B1 * | 12/2003 | Hedrick | .......................... | 124/86 |
| 6,672,299 B2 * | 1/2004 | Proctor | ............................ | 124/86 |
| 6,845,765 B1 * | 1/2005 | Allshouse et al. | ............... | 124/86 |
| 7,077,119 B1 * | 7/2006 | Dube et al. | ....................... | 124/86 |
| 7,464,908 B2 * | 12/2008 | Files | ......................... | 248/229.16 |
| 7,775,201 B2 * | 8/2010 | Cooper | ............................ | 124/86 |
| 7,987,842 B2 * | 8/2011 | McPherson | ..................... | 124/86 |
| 8,061,341 B2 * | 11/2011 | Hudkins | ....................... | 124/44.5 |

(Continued)

*Primary Examiner* — Gene Kim
*Assistant Examiner* — Alexander Niconovich
(74) *Attorney, Agent, or Firm* — Alvin R. Wirthlin

(57) ABSTRACT

A quiver assembly for detachable connection to an archery bow includes first and second releasable locking members connectable to an archery bow and a quiver. The first releasable locking member has a first base portion with a first locking pin located at one end thereof, a first guide block located at an opposite end thereof, and a first receiver contiguous with the first guide block. The second releasable locking member has a second base portion with a second locking pin located at one end thereof, a second guide block located at an opposite end thereof, and a second receiver contiguous with the second guide block. The first locking pin is received in the second receiver and the second locking pin is received in the first receiver and the first and second guide blocks are in mutual engagement when the first and second releasable locking members are connected together.

19 Claims, 6 Drawing Sheets

(56) References Cited

U.S. PATENT DOCUMENTS

| | | | |
|---|---|---|---|
| 8,434,467 B2* | 5/2013 | LoRocco | 124/86 |
| 2007/0079820 A1* | 4/2007 | Cooper | 124/44.5 |
| 2007/0079821 A1* | 4/2007 | Walk et al. | 124/86 |
| 2008/0251059 A1* | 10/2008 | McPherson | 124/44.5 |
| 2008/0302346 A1* | 12/2008 | Notestine | 124/25.7 |
| 2011/0030668 A1* | 2/2011 | Hudkins | 124/86 |
| 2011/0283982 A1* | 11/2011 | McPherson | 124/23.1 |

* cited by examiner

DETACHABLE QUIVER ASSEMBLY FOR ARCHERY BOWS

BACKGROUND OF THE INVENTION

This invention relates to quivers for archery bows, and more particularly to a quiver assembly that is removably connectable to an archery bow.

During hunting or target shooting with an archery bow, it is convenient to have a quantity of arrows readily available to the archer for fast reload. Thus, open rack quivers have been used which are attached to the bow on the side opposite the sight window. During hunting, target practice, transportation and/or storage of the archery bow and its accessories, it is sometimes desirable to quickly remove and attach the quiver for various reasons. Many of these quivers are attached in such a way that it is necessary to unscrew or unbolt the mount to remove the quiver. This can be a difficult and time consuming process, especially when hand tools are required.

Other prior art quick release mechanisms for detachably mounting a quiver to a bow do not require hand tools but suffer other drawbacks. For example, the quiver may become unintentionally separated from the bow when dropped or encountering a foreign object, such as a bush, tree, branch, other equipment carried by the hunter, and so on. In addition, vibration or rattling is prevalent in such mechanisms during hiking or when using the bow. The generation of vibrations during arrow release may lead to inaccurate shooting and additionally may cause noise while being carried by an archer, potentially frightening away game animals.

It would therefore be desirous to provide a quick release mechanism for archery quivers, accessories or the like that is simple to operate, has a positive lock against inadvertent separation, and reduces or eliminates vibration during transportation and use.

SUMMARY OF THE INVENTION

According to one aspect of the invention, a quick release connector assembly for connecting a first object to a second object includes first and second releasable locking members. The first releasable locking member includes a first base portion, a first locking pin extending from the first base portion, and a first receiver spaced from the first locking pin. The second releasable locking member includes a second base portion, a second locking pin extending from the second base portion, and a second receiver spaced from the second locking pin. The first locking pin is received in the second receiver and the second locking pin is received in the first receiver when the first and second releasable locking members are connected together.

According to another aspect of the invention, a quiver assembly for detachable connection to an archery bow includes a first releasable locking member connectable to one of an archery bow and a quiver and a second releasable locking member connectable to the other of an archery bow and a quiver. The first releasable locking member includes a first base portion, a first locking pin extending from the first base portion, and a first receiver spaced from the first locking pin. The second releasable locking member includes a second base portion, a second locking pin extending from the second base portion, and a second receiver spaced from the second locking pin. The first locking pin is received in the second receiver and the second locking pin is received in the first receiver when the first and second releasable locking members are connected together to thereby releasably connect the quiver to the archery bow.

According to yet a further aspect of the invention, a quiver assembly for detachable connection to an archery bow includes a first releasable locking member connectable to one of an archery bow and a quiver and a second releasable locking member connectable to the other of an archery bow and a quiver. The first releasable locking member has a first base portion with a first locking pin located at one end thereof, a first guide block located at an opposite end thereof, and a first receiver contiguous with the first guide block. The second releasable locking member has a second base portion with a second locking pin located at one end thereof, a second guide block located at an opposite end thereof, and a second receiver contiguous with the second guide block. The first locking pin is received in the second receiver and the second locking pin is received in the first receiver and the first and second guide blocks are in mutual engagement when the first and second releasable locking members are connected together.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
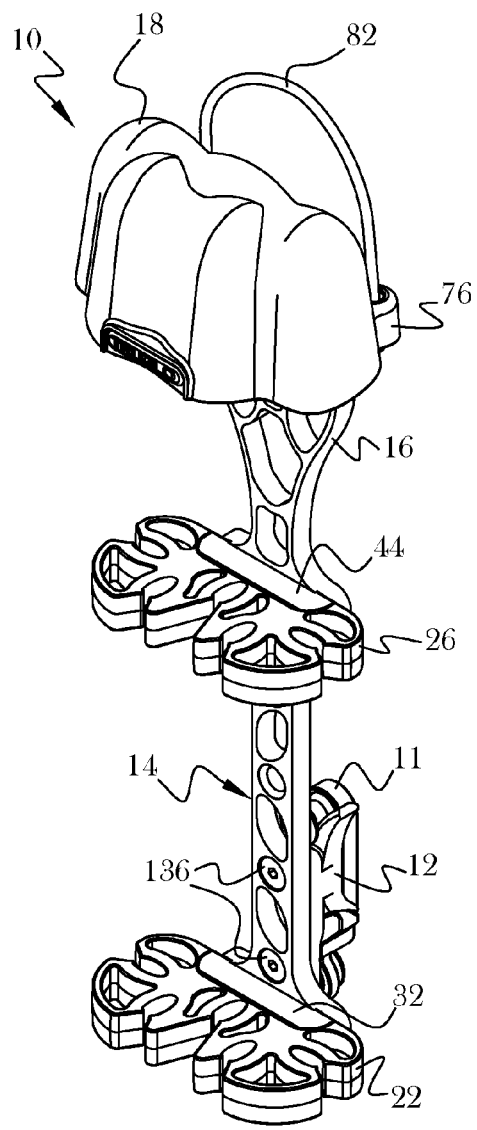
FIG. 1 is a front isometric view of a detachable quiver assembly for archery bows in accordance with the present invention.
Figure 2:
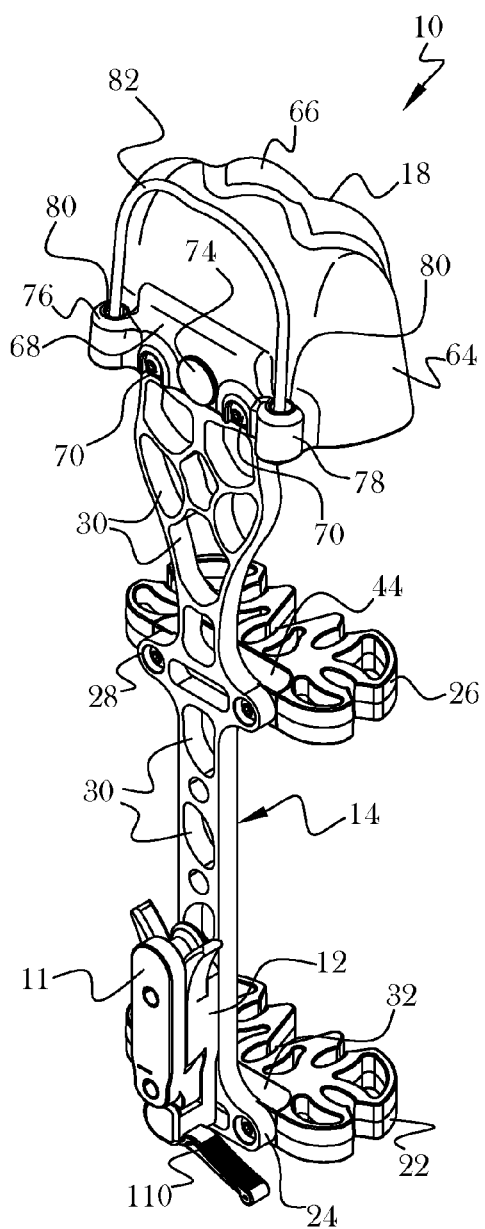
FIG. 2 is a rear isometric view of the quiver assembly.

Referring now to the drawings, and to FIGS. 1 and 2 in particular, a detachable quiver assembly 10 in accordance with the present invention is shown. The quiver assembly 10 of the present invention can be adapted for use with any type of bow including, but not limited to, recurve bows, reflex bows, longbows, compound bows, crossbows, and so on. It is also contemplated that the releasable locking members of the present invention can be used in other quick connect/disconnect applications.

The quiver assembly 10 of the present invention preferably includes a first releasable locking member 11 for connection to a bow (not shown) and a second releasable locking member 12 for connection to a quiver 14. The first releasable locking member 11 can be secured to a bowsight mounting bracket (not shown), which is in turn secured to the riser of a bow (not shown). In accordance with a further embodiment of the invention, the first releasable locking member 11 can alternatively be connected to the riser or other part of the bow. It will be understood that the first releasable locking member can be connected to a quiver and the second releasable locking member can be connected to the bow. It will be further understood that the first and second releasable locking members can be connected to other objects either directly or indirectly through one or more intermediate members.

Figure 3:
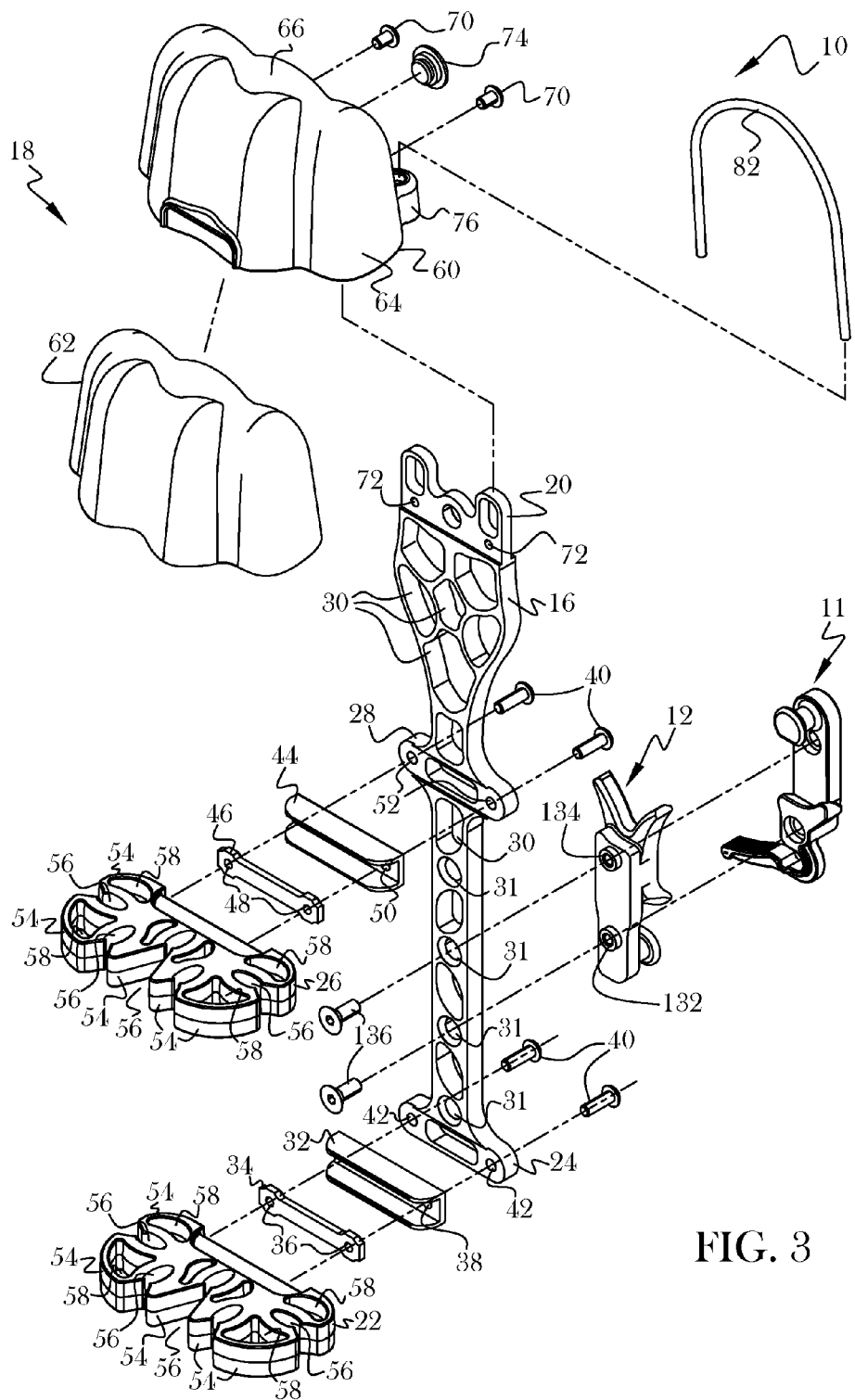
FIG. 3 is an exploded front isometric view of the quiver assembly.

With additional reference to FIG. 3, the quiver 14 preferably includes an elongate rail 16, a hood 18 connected to an upper mounting section 20 of the rail 16, a lower shaft holder 22 connected to a lower mounting section 24 of the rail 16, and an upper shaft holder 26 connected to an intermediate mounting section 28 of the rail 16 between the upper mounting section 20 and lower mounting section 24.

The elongate rail 16 is preferably generally flat in cross section and includes a plurality of openings 30 extending through the thickness of the rail for reducing its weight. A plurality of mounting holes 31 also extend through the thickness of the rail 16 for attaching the second releasable locking member thereto at a number of different positions therealong. It will be understood that the rail 16 is given by way of example only and that the present invention is adaptable to a wide variety of quivers as well as other objects.

A lower U-shaped support bracket 32 and lower support plate 34 are preferably connected to the lower shaft holder 22. The support plate 34 fits within the bracket 32 and preferably includes a pair of threaded openings 36 in alignment with openings 38 of the bracket 32. The bracket 32 extends around a rear portion of the lower shaft holder 22 and is connected thereto through well-known connection means, such as adhesive bonding, co-molding, clamping, press-fitting, welding, and so on. A pair of threaded fasteners 40 extend through spaced openings 42 formed in the lower mounting section 24 and engage the threaded openings 36 of the support plate 34 for connecting the lower shaft holder 22 to the rail 16.

Likewise, an upper U-shaped support bracket 44 and upper support plate 46 are preferably connected to the upper shaft holder 26. The support plate 46 fits within the bracket 44 and preferably includes a pair of threaded openings 48 in alignment with openings 50 of the bracket 44. The bracket 44 extends around a rear portion of the upper shaft holder 26 and is connected thereto through well-known connection means. A pair of threaded fasteners 40 extend through spaced openings 52 formed in the intermediate mounting section 28 and engage the threaded openings 48 of the support plate 46 for connecting the upper shaft holder 26 to the rail 16.

Preferably, the rail and the lower and upper support plates and brackets are formed of a nylon-reinforced plastic material through injection molding. However, it will be understood that the rail, support plates and brackets can be formed of any suitable material or combinations of materials and/or can be formed integrally as a single unit.

The lower shaft holder 22 and upper shaft holder 26 are preferably identical in construction and each preferably includes a generally rectangular-shaped body constructed of an elastomeric material. Fingers 54 are formed in each body with a slot 56 extending between each finger. The slots 56 are adapted for receiving the shaft of an arrow (not shown) and frictionally holding the arrow on the quiver 14 when not in use. An opening 58 is formed in each finger 54 so that the material surrounding each slot 56 can flex when the shaft of an arrow is inserted therein. It will be understood that the upper and lower shaft holders are not limited to the particular shape and material described, but may be constructed of any suitable material and shape. Moreover, although five slots 56 are shown for holding five arrow shafts, it will be understood that more or less slots can be provided.

With particular reference to FIG. 3, the hood 18 preferably includes an outer housing 60 and a resilient inner boot 62 that is shaped to conform to the inner surface of the housing 60. The inner boot preferably includes hollow protrusions (not shown) or the like that are in alignment with the slots 56 of the lower shaft holder 22 and upper shaft holder 26 to receive arrow tips or points (not shown) and isolate them from each other and the user. The boot 62 is preferably constructed of a resilient elastomeric material. However, it will be understood that the boot 62 can be constructed of any suitable material and can have any desired shape for receiving the tip of one or more arrows.

The outer housing 60 preferably has a continuous side wall 64 and an upper wall 66 that form a hollow interior for receiving the boot 62. A receptacle or pocket 68 (FIG. 2) is formed in the side wall 64 for receiving the upper mounting section 20 of the rail 16. Fasteners 70 extend through corresponding apertures (not shown) in the pocket and into threaded openings 72 formed in the upper mounting section 20 of the rail 16 to thereby secure the hood 18 to the rail. A light source 74, preferably in the form of a battery-operated LED module, can be installed on the hood 18 for projecting light into the interior of the inner boot 62. A pair of generally cylindrically-shaped protrusions 76, 78 are located on either side of the pocket 68. A bore 80 is formed in each protrusion for receiving a cord or strap 82. The ends of the cord are preferably knotted or otherwise enlarged once installed in the bores to prevent separation of the cord from the outer housing. The cord 82 can be used for carrying or hanging the quiver assembly 10 and/or carrying the bow to which it may be connected.

Figure 4:
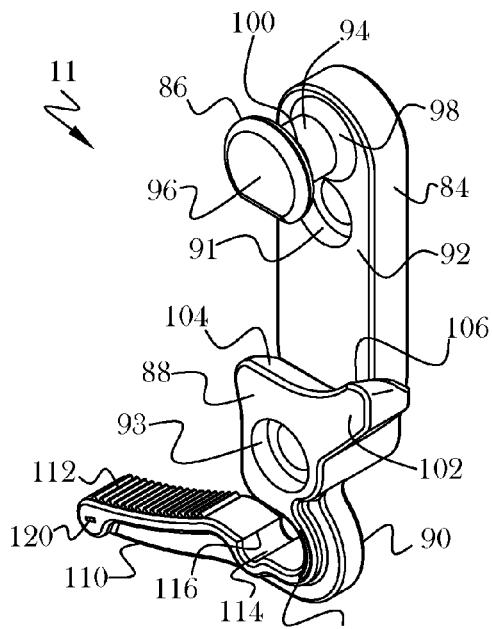
FIG. 4 is a front isometric view of a first releasable locking member attachable to an archery bow in accordance with the present invention.
Figure 5:
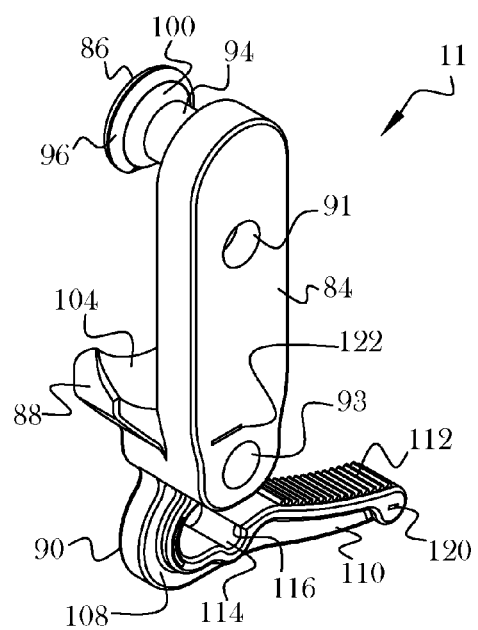
FIG. 5 is a rear isometric view of the first releasable locking member.
Figure 10:
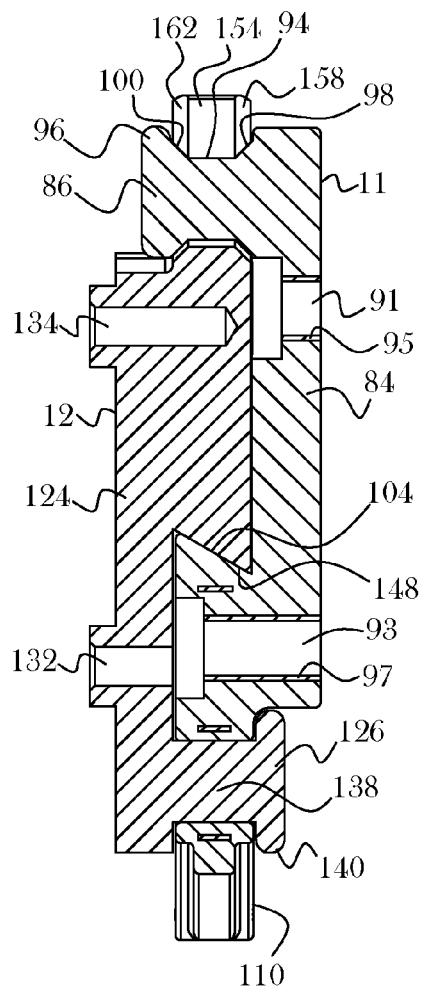
FIG. 10 is a sectional view of the connected releasable locking members taken along line 10-10 of FIG. 8.

Referring now to FIGS. 4 and 5, the first releasable locking member 11 preferably includes a first base portion 84 with a first locking pin 86 located at one end thereof, a first guide block 88 located at an opposite end thereof, and a first receiver 90 contiguous with the first guide block 88. A pair of countersunk apertures 91, 93 extend through the thickness of the first base portion 84 and are preferably sized to receive reinforcing sleeves 95, 97, respectively (FIG. 10). The sleeves 95, 97 are in turn adapted to receive fasteners (not shown) to secure the first releasable locking member 11 to a bowsight mounting bracket, the riser of a bow (not shown) or other object.

The first locking pin 86 preferably includes a post 94 that extends outwardly from a front surface 92 of the first base portion 84 and a flange 96 formed at an outer free end of the post 94. An inner chamfered surface 98 extends between the post 94 and the front surface 92 while an opposing outer chamfered surface 100 extends between the post 94 and the flange 96. The purpose of the opposing chamfered surfaces will be described in greater detail below.

The first guide block 88 also extends outwardly from the front surface 92 of the base portion 84 and has a front surface 102 and an upper surface 104 that extends downwardly toward the front surface 92 of the base portion at an acute angle with respect to the front surface 102 of the first guide block. The upper surface 104 forms a first dovetail channel or groove and includes a first curved cam section 106, the purpose of which will be described in further detail below.

Figure 11:
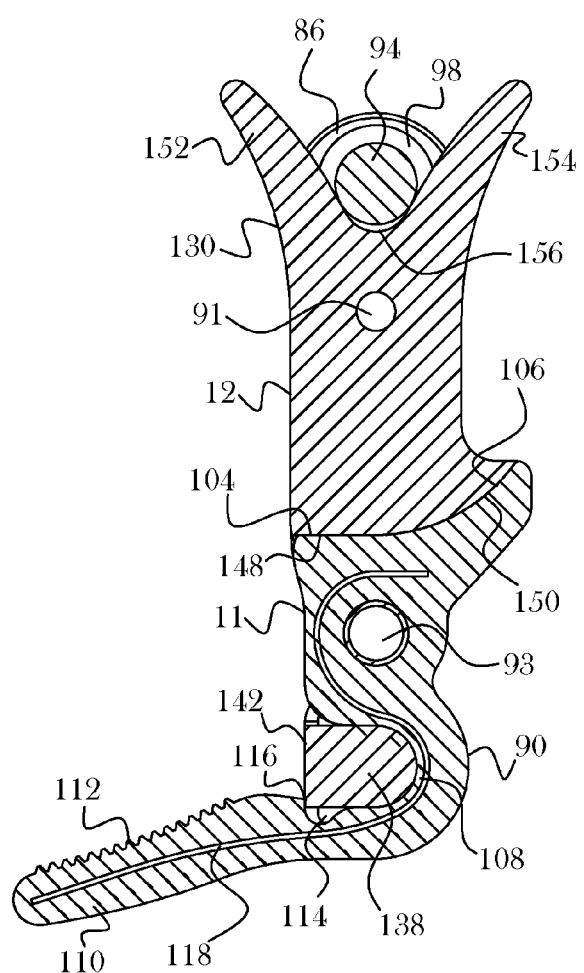
FIG. 11 is a sectional view of the connected releasable locking members taken along line 11-11 of FIG. 8.

The first receiver 90 preferably includes a curved section 108 that extends downwardly from the first guide block 88 and a lever arm section 110 extending from the curved section 108. An upper surface of the lever arm section 110 can have serrations 112 or the like to provide a gripping surface for the thumb or finger of a user during operation. A groove 114 extends across the lever arm section 110 and a locking edge 116 is contiguous with the groove 114 for locking the first and second releasable locking members together. When the first releasable locking member 11 is constructed of a plastic material, such as reinforced nylon, a resilient insert 118 (FIG. 11), preferably constructed of spring steel or the like, is molded with the first releasable locking member to provide increased strength against breakage and resistance to movement. As shown in FIGS. 5 and 11, the insert 118 extends through the lever arm section 110 and curved section 108 and curves around the aperture 93. Opposite ends 120 and 122 of the insert 118 extend laterally through the lever arm section and first base portion, respectively, as shown in FIG. 5. It will be understood that the first releasable locking member 11 can be constructed of any suitable material.

Figure 6:
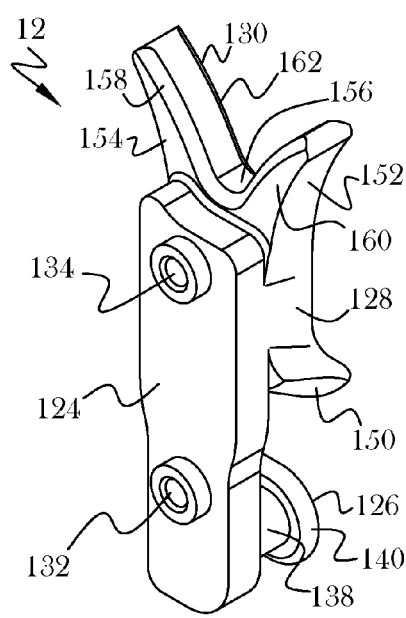
FIG. 6 is a front isometric view of a second releasable locking member attachable to a quiver frame in accordance with the present invention.
Figure 7:
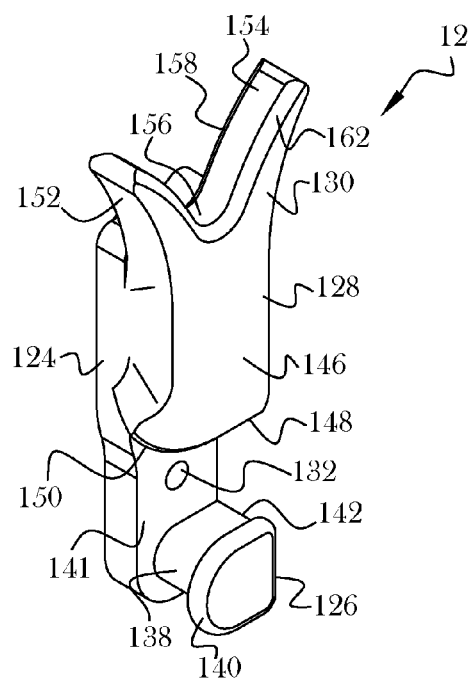
FIG. 7 is a rear isometric view of the second releasable locking member.
Figure 8:
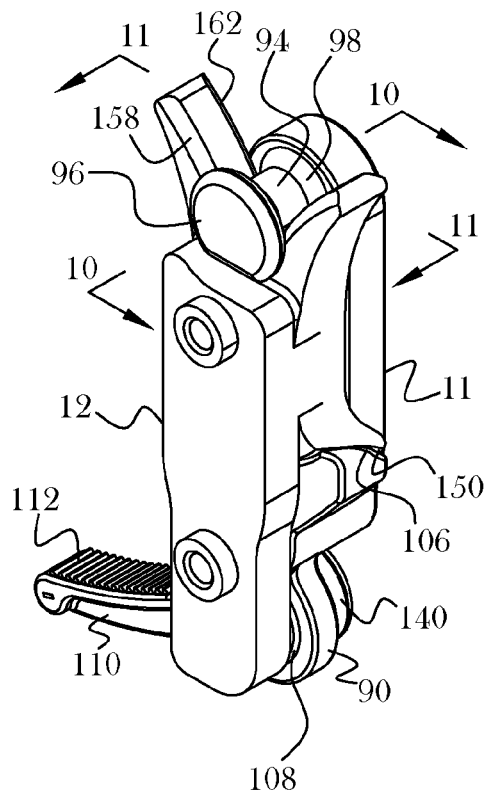
FIG. 8 is an enlarged front isometric view of the first and second releasable locking members connected together.
Figure 9:
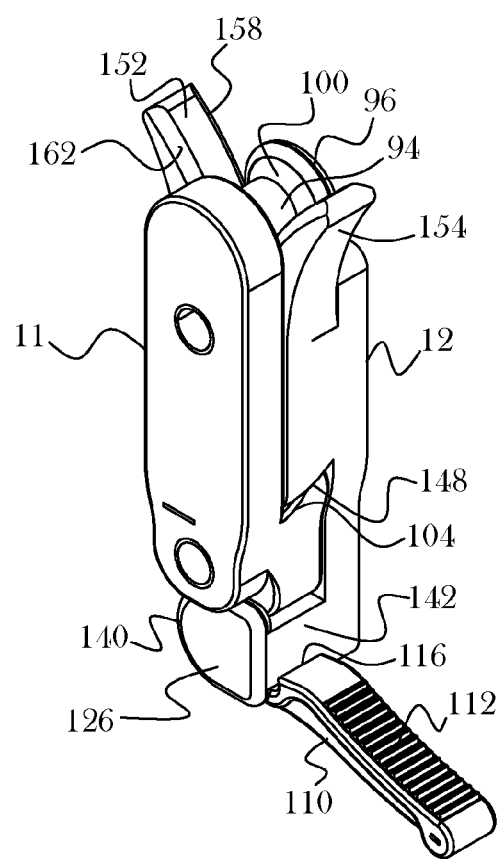
FIG. 9 is an enlarged rear isometric view thereof.

Referring now to FIGS. 6 and 7, the second releasable locking member 12 is preferably constructed of a reinforced plastic material, such as reinforced nylon, and preferably includes a second base portion 124 with a second locking pin 126 located at one end thereof, a second guide block 128 located at an opposite end thereof, and a second receiver 130 contiguous with the second guide block 128. A pair of threaded apertures 132, 134 are preferably formed in the second base portion 124 and are adapted to receive threaded fasteners 136 (FIG. 3) which extend through two of the mounting holes 31 to secure the second releasable locking member 12 to the quiver or other object. It will be understood that the second releasable locking member 12 can be constructed of any suitable material.

The second locking pin 126 preferably includes a post 138 that extends outwardly from the rear surface 141 of the second base portion 124 and a flange 140 formed at an outer free end of the post 138. A flat engagement surface 142 is preferably formed on one side of the post 138 for engaging the locking edge 116 of the lever arm section 110, as shown in FIG. 11.

The second guide block 128 also extends outwardly from the rear surface 141 of the second base portion 124 and has a rear surface 146 and a lower surface 148 that extends upwardly toward the rear surface 141 of the second base portion at an acute angle with respect to the rear surface 146 of the second guide block. The lower surface 148 forms a second dovetail channel or groove and includes a second curved cam section 150 for mating with the first dovetail channel and first curved cam section of the first releasable locking member 11, as shown in FIGS. 10 and 11.

The second receiver 130 is preferably generally V-shaped and includes a first arm section 152 connected to a second arm section 154 by a curved section or seat 156. An outer chamfered surface 158 preferably extends along the first arm section 152, seat 156 and second arm section 154 and is contiguous with a front surface 160 of the second guide block 128. An inner chamfered surface 162 also preferably extends along the first arm section 152, seat 156 and second arm section 154 and is contiguous with the rear surface 146 of the second guide block 128. The inner and outer chamfered surfaces 162 and 158 are adapted to mate with the inner and outer chamfered surfaces 98 and 100, respectively, of the first locking pin 86 when the first and second releasable locking members 11, 12 are connected together, as shown in FIG. 10.

Figure 12:
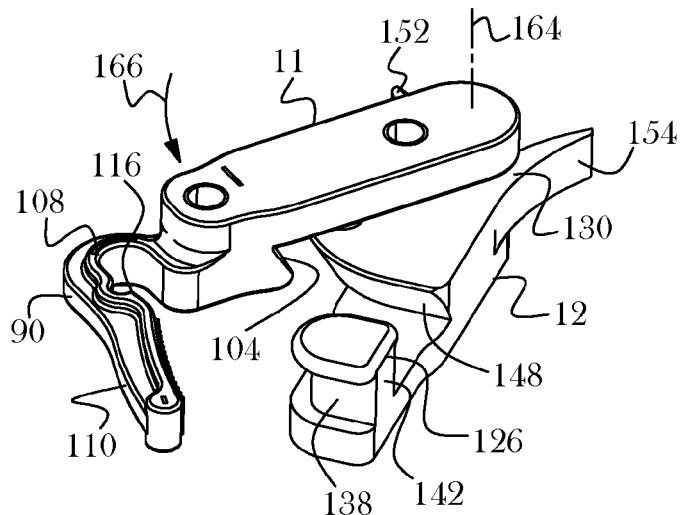
FIG. 12 is a perspective view of the connected releasable locking members at a first rotational position.

Referring now to FIGS. 8-14, the first and second releasable locking members 11 and 12 are connected together by inserting the first locking pin 86 of the first releasable locking member 11 into the second receiver 130 of the second releasable locking member 12, with the inner and outer chamfered surfaces 98 and 100 in contact with the inner and outer chamfered surfaces 162 and 158, respectively, of the second receiver 130. The flange 86 of the first releasable locking member 11 ensures that the first locking pin 86 is in proper alignment with the second receiver 130. One or both releasable locking members 11, 12 are then rotated together about a central axis 164 (FIG. 12) of the first locking pin 86. As shown in FIG. 12 for example, the first locking pin 11 is rotated about the central axis 164 toward the second locking pin 12 in a direction as represented by arrow 166.

Figure 13:
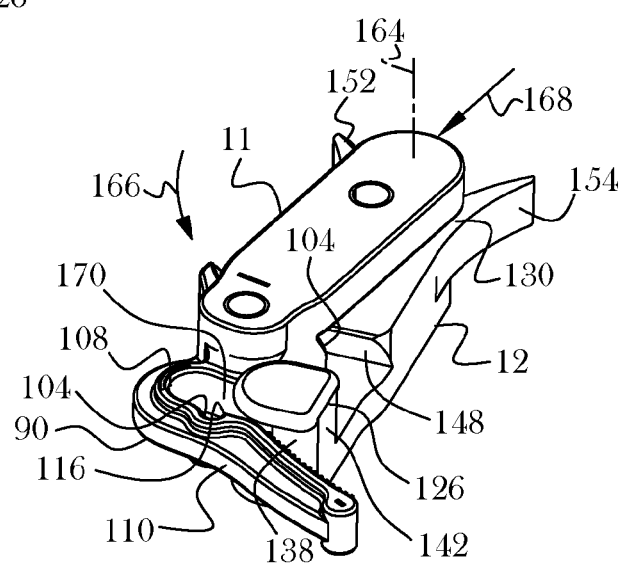
FIG. 13 is a perspective view of the connected releasable locking members at a second rotational position.
Figure 14:
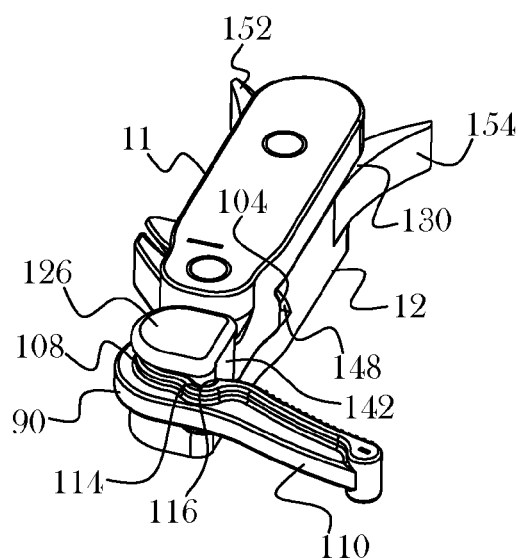
FIG. 14 is a perspective view of the connected releasable locking members at a third rotational or locked position.

As the first receiver 90 of the first releasable locking member 11 comes into contact with the curved portion of the post 138 of the second locking pin 126, the lever arm 110 will rotate outwardly in a direction as represented by arrow 168 in FIG. 13, to create a sufficiently large gap 170 (FIG. 13) for the second locking pin to pass through. The resilient nature of the lever arm section 110 helps to pull the post 94 of the first locking pin 86 deeper into the seat 156 (FIGS. 6, 7) of the second receiver 130. During rotation, the first and second dovetail grooves 104 and 148 of the first and second releasable locking members 11 and 12, respectively, will also come into mutual sliding contact. Further rotation of the first releasable locking member causes the post 138 to snap clear of the lever arm section 110 and be seated in the first receiver 90 with the engagement surface 142 of the post 138 in engagement with the locking edge 116 of the lever arm section 110 to prevent unwanted reverse rotation and potential separation of the releasable locking members. The groove 114 in the lever arm section 116 ensures sufficient clearance for the post 138 during rotational movement.

As the post 138 clears the lever arm section 110, the curved cam sections 106 and 150 of the first and second releasable locking members 11 and 12, respectively, will come into mutual sliding contact to drive the first locking pin 86 into the seat 156. The chamfered surfaces 98 and 100 of the first locking pin 86 will also be in sliding contact with the chamfered surfaces 158 and 162, respectively, of the second receiver 130 to create a wedge effect between the first locking pin and the second receiver. The wedge effect created by the cam sections 106, 150 and the chamfered surfaces 98, 100, 158, and 162, together with the anti-rotation effect created by the engagement surface 140 and locking edge 116 ensure that the first and second releasable locking members 11, 12 (and any object attached to them) will be vibration-free and resistant to inadvertent separation when compared to prior art solutions. The flange 140 of the second locking pin 126 also ensures that alignment is maintained between the locking members during the connecting procedure.

In order to separate the first and second releasable locking members, the lever arm section 110 is depressed with the thumb or finger of a user and one or both members are rotated in the opposite direction until the first locking pin 86 is clear of the second receiver 130. In this manner, the quiver assembly 10 may be easily installed on and removed from the bow without the use of hand tools.

It will be understood that the term "preferably" as used throughout the specification refers to one or more exemplary embodiments of the invention and therefore is not to be interpreted in any limiting sense. It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. It will be understood, therefore, that the present invention is not limited to the particular embodiments disclosed, but also covers modifications within the spirit and scope of the invention as defined by the appended claims.

I claim:

1. A quick release connector assembly for connecting an archery accessory to an archery bow, comprising:
    a first releasable locking member adapted for connection to one of the archery accessory and archery bow and including:
        a first base portion extending along a first plane;
        a first locking pin extending outwardly from the first base portion, the first locking pin defining a central axis that extends in a direction transverse to the first plane; and
        a first receiver spaced from the first locking pin; and
    a second releasable locking member adapted for connection to the other of the archery accessory and archery bow, the second releasable locking member including:
        a second base portion extending along a second plane parallel to the first plane;
        a second locking pin extending outwardly from the second base portion in a direction transverse to the second plane; and
        a second receiver spaced from the second locking pin;
    wherein the first locking pin is received in the second receiver and rotated about the central axis such that the second locking pin pivots into the first receiver when the first and second releasable locking members are connected together with the first and second planes remaining parallel during rotation.

2. A quick release connector assembly according to claim 1, wherein at least one of the first and second releasable locking members includes a cam surface for engaging the other of the first and second releasable locking members to thereby draw the first locking pin into the second receiver.

3. A quick release connector assembly according to claim 2, wherein the first locking pin and the second receiver include mutually engageable chamfered surfaces to thereby wedge the first locking pin into the second receiver under cam action.

4. A quick release connector assembly according to claim 1, wherein the first receiver comprises a curved section for receiving the second locating pin and a resilient lever arm section extending from the curved section.

5. A quick release connector assembly according to claim 4, wherein the second locking pin includes an engagement surface and the lever arm section includes a locking edge that contacts the engagement surface under biasing force when the second locking pin is positioned in the first receiver to thereby prevent inadvertent separation of the first and second releasable locking members.

6. A quick release connector assembly according to claim 5, wherein the lever arm section further includes a gripping surface for moving the lever arm against the biasing force to thereby separate the engagement surface and the locking edge and separate the first and second releasable locking members.

7. A quiver assembly for detachable connection to an archery bow, the quiver assembly comprising:
    a first releasable locking member connectable to one of an archery bow and a quiver, the first releasable locking member including:
        a first base portion extending along a first plane;
        a first locking pin extending outwardly from the first base portion, the first locking pin defining a central axis that extends in a direction transverse to the first plane; and
        a first receiver spaced from the first locking pin; and
    a second releasable locking member connectable to the other of an archery bow and a quiver, the second releasable locking member including:
        a second base portion extending along a second plane parallel to the first plane;
        a second locking pin extending outwardly from the second base portion in a direction transverse to the second plane; and
        a second receiver spaced from the second locking pin;
    wherein the first locking pin is received in the second receiver and rotated about the central axis such that the second locking pin pivots into the first receiver when the first and second releasable locking members are connected together with the first and second planes remaining parallel during rotation, to thereby releasably connect the quiver to the archery bow.

8. A quiver assembly according to claim 7, wherein at least one of the first and second releasable locking members includes a cam surface for engaging the other of the first and second releasable locking members to thereby draw the first locking pin into the second receiver.

9. A quiver assembly according to claim 8, wherein the first locking pin and the second receiver include mutually engageable chamfered surfaces to thereby wedge the first locking pin into the second receiver under cam action.

10. A quiver assembly according to claim 7, wherein the first receiver comprises a curved section for receiving the second locating pin and a resilient lever arm section extending from the curved section.

11. A quiver assembly according to claim 10, wherein the second locking pin includes an engagement surface and the lever arm section includes a locking edge that contacts the engagement surface under biasing force when the second locking pin is positioned in the first receiver to thereby prevent inadvertent separation of the first and second releasable locking members.

12. A quiver assembly according to claim 11, wherein the lever arm section further includes a gripping surface for moving the lever arm section against the biasing force to thereby separate the engagement surface and the locking edge and disconnect the first and second releasable locking members.

13. A quiver assembly for detachable connection to an archery bow, the quiver assembly comprising:
    a first releasable locking member connectable to one of an archery bow and a quiver, the first releasable locking member including a first base portion extending along a first plane with a first locking pin located at one end thereof and extending outwardly therefrom, the first locking pin defining a central axis that extends in a direction transverse to the first plane, a first guide block located at an opposite end of the first base portion and extending outwardly therefrom, and a first receiver contiguous with the first guide block;

a second releasable locking member connectable to the other of an archery bow and a quiver, the second releasable locking member including a second base portion extending along a second plane parallel to the first plane, with a second locking pin located at one end thereof and extending outwardly therefrom, a second guide block located at an opposite end of the first base portion and extending outwardly therefrom, and a second receiver contiguous with the second guide block;

wherein the first locking pin is received in the second receiver and rotated about the central axis such that the second locking pin pivots into the first receiver and the first and second guide blocks are in mutual engagement when the first and second releasable locking members are connected together with the first and second planes remaining parallel during rotation.

14. A quiver assembly according to claim 13, wherein the first and second guide blocks include a dovetail groove for mating with the second and first guide blocks, respectively.

15. A quiver assembly according to claim 14, wherein the dovetail grooves include curved cam sections to thereby draw the first locking pin into the second receiver.

16. A quiver assembly according to claim 15, wherein the first locking pin and the second receiver include mutually engageable chamfered surfaces to thereby wedge the first locking pin into the second receiver when the curved cam sections are mutually engaged.

17. A quiver assembly according to claim 16, wherein the first receiver comprises a curved section for receiving the second locating pin and a resilient lever arm section extending from the curved section.

18. A quiver assembly according to claim 17, wherein the second locking pin includes an engagement surface and the lever arm section includes a locking edge that contacts the engagement surface under biasing force when the second locking pin is positioned in the first receiver to thereby prevent inadvertent separation of the first and second releasable locking members.

19. A quiver assembly according to claim 18, wherein the lever arm section further includes a gripping surface for moving the lever arm section against the biasing force to thereby separate the engagement surface and the locking edge and disconnect the first and second releasable locking members.

* * * * *

UNITED STATES PATENT AND TRADEMARK OFFICE
Certificate

Patent No. 8,522,766 B2                                    Patented: September 3, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Paul LoRocco, Dallas, TX (US); John Estridge, Plano, TX (US); and Greg Webb, Garland, TX (US).

Signed and Sealed this Sixth Day of May 2014.

*GENE KIM*
*Supervisory Patent Examiner*
*Art Unit 3711*
*Technology Center 3700*